United States Patent [19]

Stude

[11] Patent Number: 5,277,361

[45] Date of Patent: * Jan. 11, 1994

[54] REUSABLE MAILING ENVELOPE

[76] Inventor: Michael Stude, 1021 S. Grove Ave., Barrington, Ill. 60010

[*] Notice: The portion of the term of this patent subsequent to Mar. 30, 2100 has been disclaimed.

[21] Appl. No.: 996,391

[22] Filed: Dec. 23, 1992

Related U.S. Application Data

[63] Continuation of Ser. No. 872,545, Apr. 23, 1992, Pat. No. 5,197,663.

[51] Int. Cl.⁵ .............................................. B65D 27/06
[52] U.S. Cl. ................................... 229/303; 229/306; 229/311; 229/314
[58] Field of Search ............... 229/300, 301, 302, 303, 229/306, 314, 316, 311

[56] References Cited

U.S. PATENT DOCUMENTS 1,575,769  3/1926  Kaye .
4,715,531 12/1987  Stewart et al. .
4,730,768  3/1988  Gendron .

FOREIGN PATENT DOCUMENTS 0011572 of 1901 United Kingdom .

Primary Examiner—Allan N. Shoap
Assistant Examiner—Jes F. Pascua
Attorney, Agent, or Firm—Thomas R. Vigil

[57] ABSTRACT

A reusable mailing envelope including: a panel including a front panel, a seal flap, a rear panel opposite the seal flap and first and second side panels, connected to the body section by fold lines; and reusable structure for allowing the envelope to be reused as a mailing envelope connected to the rear flap along another fold line including a foldable panel and a reusable closure flap, the reusable structure having a first condition inside the envelope when initially mailed and a second condition wherein a portion is outside the envelope when subsequently mailed.

17 Claims, 3 Drawing Sheets

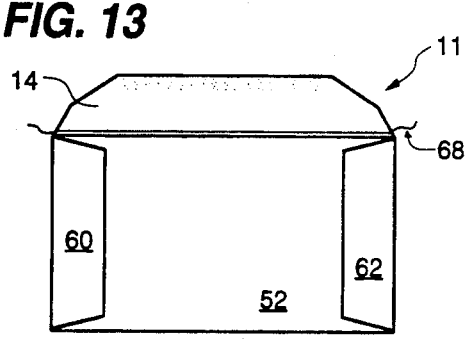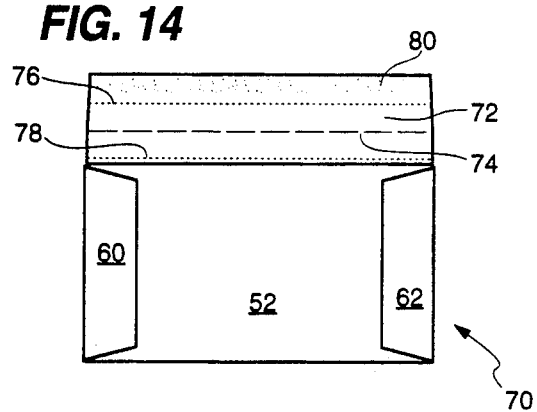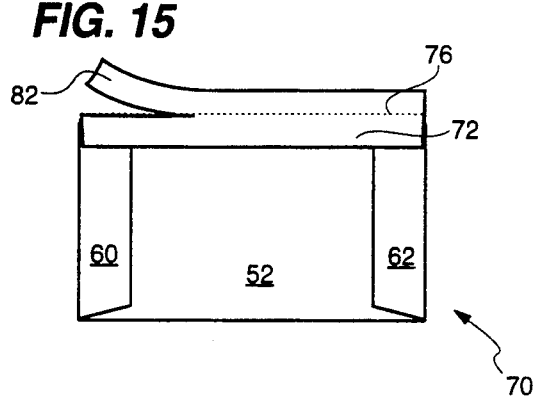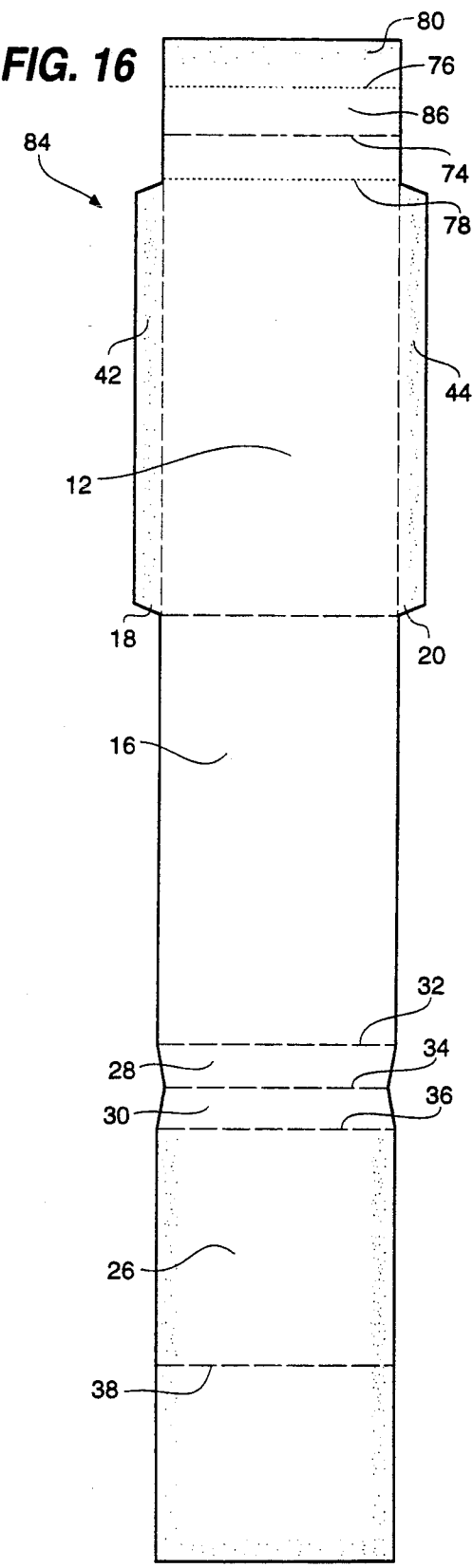

REUSABLE MAILING ENVELOPE

This is a continuation of application Ser. No. 07/872,545, filed on Apr. 23, 1992 now U.S. Pat. No. 5,197,663.

BACKGROUND OF THE INVENTION

1. Field of the Invention

The present invention relates to improved envelopes and, more particularly, to a reusable mailing envelope which is adapted for use for original mail and then for reuse for return mail.

2. Description of the related art including information disclosed under 37 CFR §§1.97-1.99.

Heretofore, a number of reusable mailing envelope structures have been proposed. Examples of some of these envelope structures are disclosed in the following U.S. patents:

| U.S. Pat. No. | Patentee |
| --- | --- |
| 4,729,507 | Kim |
| 4,715,531 | Stewart |
| 4,993,624 | Schlich |
| 4,436,202 | Berkley |
| 4,403,696 | Newell |
| 4,334,618 | Buescher |

The Schlich U.S. Pat. No. 4,993,624 discloses a reusable envelope for commercial mass mailings. The envelope includes a window aligned along the bottom right edge of the front envelope panel. The envelope additionally includes a two-portion closure flap for allowing identification marks and appropriate postage to be visible from the front of the envelope only during one trip, as appropriate.

The Kim U.S. Pat. No. 4,729,507 discloses an adhesive sealed envelope having a tear away portion extending across an area in a back panel lying under an adhesive seal of a top flap when the envelope is sealed. A tear line defining the tear away portion is hidden by the top flap. The envelope is opened in the natural way by grasping the flap and pulling upwardly causing the envelope to open along the tear line.

The Stewart U.S. Pat. No. 4,715,531 discloses a remailable envelope constructed of a single sheet having folds and having perforations spaced inward from nonfolded edges of the envelope, the area between the perforation and nonfolded edges are detached for reuse of the envelope.

The Berkley U.S. Pat. No. 4,436,202 discloses a reusable envelope for X-ray prints adapted to receive a removable card insert.

The Newell U.S. Pat. No. 4,403,696 discloses a reusable envelope assembly which includes first and second tear lines across two panels. The first tear line is spaced inwardly from one side of the envelope a distance greater than the corresponding separation between the second tear line and the one side of the envelope. An insert formed within the envelope is secured between front and back panels along one side. By pinching the envelope and exerting a pulling force on it from its opposite sides, the envelope is burst. This separates the insert and a removable portion of the envelope along the first and second tear lines. The separation between the first and second tear lines exposes a portion of the back panel that extends outwardly from the first tear line. The extended portion of the back panel is foldable over the first tear line and the front panel as a covering flap, enabling the envelope to be used a second time. The remainder of the envelope includes third and fourth tear lines of greater bursting strength than the first and second tear lines. These are used to separate the reused envelope in half for opening purposes.

The Buescher U.S. Pat. No. 4,334,618 discloses a snap-open envelope having perforations arranged so that an end portion separates from the remaining portion to expose the contents. The remaining portion provides a return or reusable envelope having an end closure flap which, when the return envelope is closed, may cover a portion of the front panel of the original envelope, with a portion of the original back panel of the original envelope becoming the front panel of the return envelope.

SUMMARY OF THE INVENTION

According to the present invention there is provided a reusable mailing envelope made from a blank comprising: a front panel and a rear panel, a seal flap having side edges and being connected to one of the panels at a fold line, the other panel being connected at a fold line to the one panel opposite the seal flap, structure for connecting the panels together along adjacent side edges thereof and, when used, the seal flap is folded over the sealed to one of the panels to form a closed envelope with a back side and a front side, and reusable structure for allowing the envelope to be reused as a mailing envelope, connected to the other panel at a first connecting fold line, the reusable structure including a foldable panel portion and a reusable closure flap connected at a second connecting fold line to the foldable panel, the foldable panel portion including a center fold line extending laterally thereacross forming a first panel section adjacent to and hingedly connected to the other panel at the first connecting fold line and a second panel section connected to the reusable closure flap and the first panel section having adhesive on a back outer side surface thereof which is adjacent to the outer surface of the other panel so that when the envelope is first used, the reusable flap is in the envelope and, when the envelope is reused, the envelope is filled, followed by sealing the reusable closure flap to one side of the envelope and by sealing the first panel section having the adhesive on a back outer side surface thereof to the other side of the envelope.

BRIEF DESCRIPTION OF THE DRAWINGS

FIG. 13 is a plan view of one embodiment of the reusable mailing envelope of FIG. 1 including an opening string along the seal flap fold line.

FIG. 14 are plan views of one embodiment of the reusable mailing envelope of FIG. 1 including a detachable seal flap in the rear position.

FIG. 15 are plan views of one embodiment of the reusable mailing envelope of FIG. 1 including a detachable seal flap in the closed position, with the detachable part partially detached.

FIG. 16 is a plan view of a blank for use in the construction of a side loaded reusable mailing envelope similar to the envelope shown in FIG. 1.

DESCRIPTION OF THE PREFERRED EMBODIMENT(S)

Figure 1:
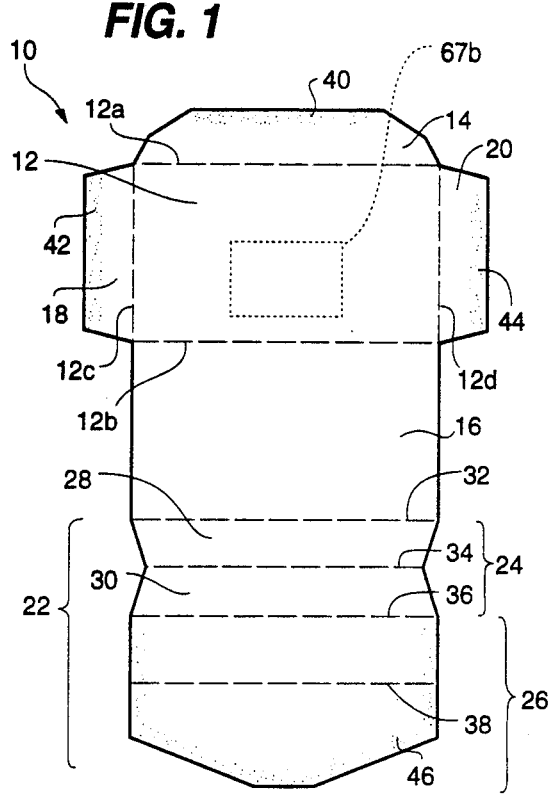
FIG. 1 is a plan view of a blank for use in the construction of a reusable mailing envelope according to the teachings of the invention, which is adapted for use for original mail and then reused for return mail.

While the reusable mailing envelope of the present invention is susceptible of several constructions, there are shown in FIGS. 1-16, several preferred embodiments of a reusable mailing envelope constructed according to the teachings of the present invention, with the understanding that the present disclosure is not intended to be limited to the specific constructions thereof illustrated in the drawings.

Figure 5:
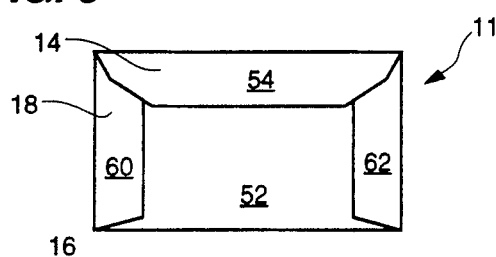
FIG. 5 is a rear view of the reusable mailing envelope with a seal flap and a side flap folded over and sealed to form an assembled envelope for mailing.
Figure 6:
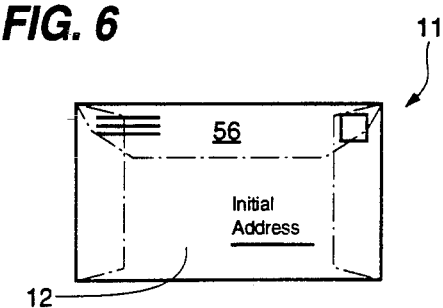
FIG. 6 is a front view of the reusable mailing envelope shown in FIG. 5.

Illustrated in FIG. 1, is a blank 10 for making a reusable mailing envelope 11 (FIGS. 5 and 6). The reusable mailing envelope 11 is formed from the blank 10 including: a front panel 12, a seal flap 14 connected at a fold line to the front panel 12, a rear panel 16 connected at a fold line to the front panel 12 opposite the seal flap 14, first and second side panels 18 and 20 connected to the front panel 12 at fold line, and reusable structure 22, for allowing the envelope 11 to be reused as a mailing envelope, connected to the front panel 12 along another fold line. The reusable structure 22 includes a foldable panel or foldable panel portion 24 and a reusable closure flap 26.

Figure 4:
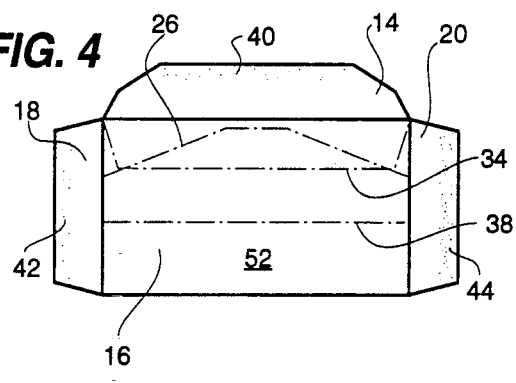
FIG. 4 is a plan view of the blank shown in FIG. 3 but showing the rear blank folded upwardly over a front panel of the blank.
Figure 7:
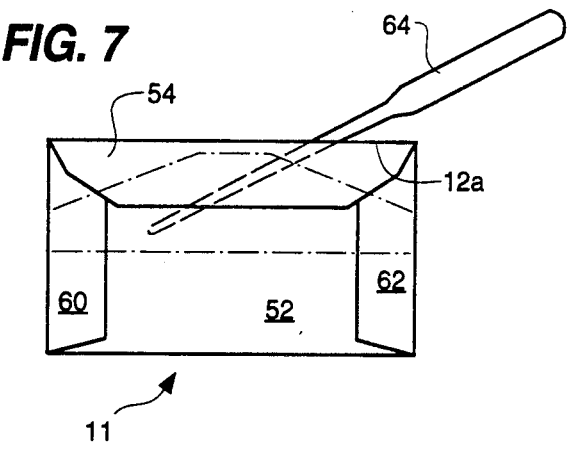
FIG. 7 is a rear view of the envelope shown in FIG. 5, being opened with a conventional letter opener.
Figure 8:
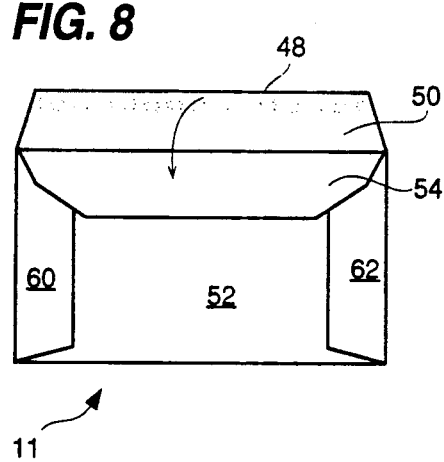
FIG. 8 is a rear view of the envelope shown in FIG. 5, with a foldable panel being removed from the inside of the envelope for eventual adhesion to exterior surface, illustrating the first step in the sequence of steps to construct the envelope for return mail.

The reusable structure 22 has a first condition inside the envelope when initially mailed, as illustrated in FIGS. 4 and 7, and a second condition wherein a portion is outside the envelope 11 when subsequently mailed, as illustrated in FIG. 8.

Fold lines 12a, 12b, 12c and 12d separate the front panel 12 from the flaps 14, 18 and 20 and the rear panel 16. More particularly, seal flap fold line 12a separates the front panel 12 from the seal flap 14. Similarly, the rear panel fold line 12b separates the front panel 12 from the rear panel 16, the first side fold line 12c separates the front panel 12 from the first side panel 18, and the second side fold line 12d separates the front panel 12 from the second side panel 20.

The foldable panel 24 includes a first center fold line 34 extending laterally thereacross dividing the panel 24 into a first panel section 28 and a second panel section 30. The first panel section 28 is adjacent and hingably connected to the rear panel 16 along a second fold line 32. The second panel section 30 is adjacent to and hingably connected to the reusable closure flap 26 along a third fold line 36.

The reusable closure flap 26 includes a center fold line 38 for facilitating the removal of the closure flap 26 out of the envelope 11 to move the envelope 11 from the first condition to the second condition.

Adhesive strips or gum 40, 42 and 44 are included on the seal flap 14, first side flap 18 and second side flap 20 for sealing the flaps 14, 18 and 20 to the rear panel 16 to form the envelope 11.

Adhesive strips or gum 46 and 48 are provided on reusable closure flap 26 and on the back side 50 of the panel section 28 for remailing.

For initial mailing, the adhesive strips 40, 42 and 44 are adhered to an exterior surface 52 (FIG. 4) of rear panel 16, as illustrated in FIG. 5.

Figure 11:
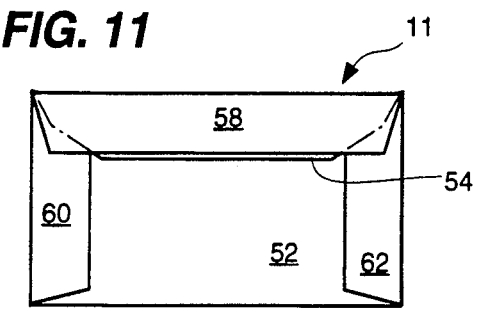
FIG. 11 is a rear view of the envelope shown in FIG. 10, stuffed, sealed and ready for mailing.
Figure 12:
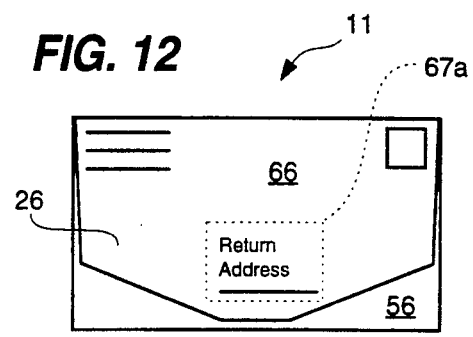
FIG. 12 is a front view of the envelope shown in FIG. 10, stuffed, sealed and ready for mailing.

In the reuse condition, 1) adhesive strip 48 is adhered to an exterior surface 52 of the rear panel 16 and/or on exterior surface 54 of the seal flap 14; and 2) the adhesive strip 46 on the reusable closure flap 26 is adhered to an exterior side surface 56 of the front panel 12, as illustrated in FIGS. 11 and 12, respectively.

FIGS. 2-6 illustrate how the envelope 11 is constructed and assembled from the blank 10 along the various fold lines for initial use.

Figure 2:
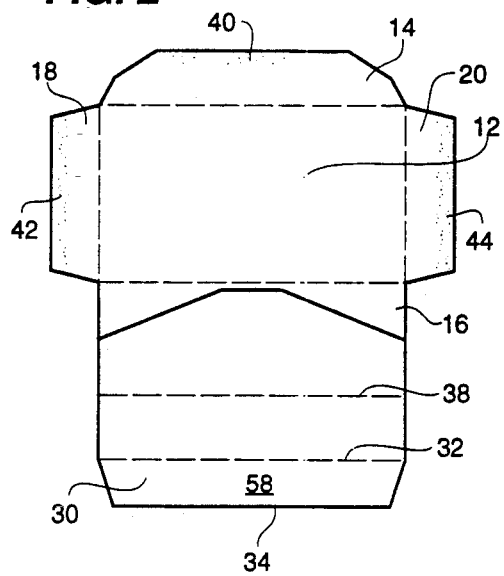
FIG. 2 is a plan view of the blank of FIG. 1, but showing a reusable closure flap folded over onto a rear panel of the blank.

In FIG. 2, the second panel section 30 of the foldable panel 24 and the reusable closure flap 26 are folded over the rear panel 16 along the center fold line 34.

Figure 3:
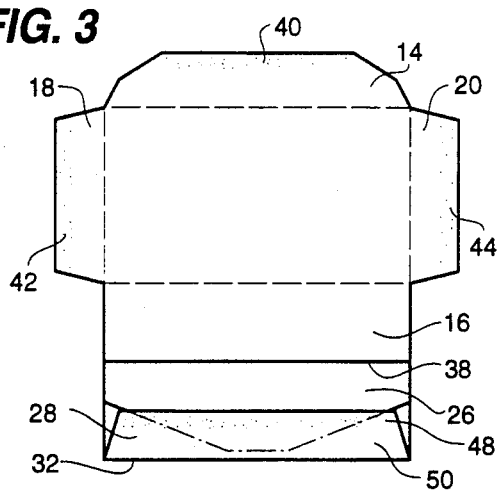
FIG. 3 is a plan view of the blank shown in FIG. 2 but showing a foldable panel folded inwardly over the rear panel.

FIG. 3 illustrates two additional folds. First, the reusable closure flap 26 is folded in half along the center fold line 38, and subsequently the foldable panel 24 is folded over a portion of the reusable closure flap 26 along the fold lines 32 and 36 with the surface 50 with the adhesive 48 now facing upwardly.

In FIG. 4, the rear panel 16 is shown folded along rear panel fold line 12b over front panel 12.

In FIG. 5, the first and second side panels 18 and 20 are shown folded along fold lines 12c and 12d, respectively, and the adhesive strips 42 and 44 are adhesively bound to the exterior surface 52 of the rear panel 16. After an appropriate mailing piece has been stuffed into envelope 11, the adhesive strip 40 on the seal flap 14 is adhered to the exterior surface 52 for initial mailing.

Also illustrated in FIG. 2 is an exterior surface 58 on the second section 30 of foldable panel 24. An exterior surface 52 on the rear panel 16, the exterior surface 54 on the seal flap 14, an exterior surface 60 of the side flap 18, and an exterior surface 62 of the second side flap 20 are illustrated in FIG. 5. The exterior surface 56 of the front panel 12 is illustrated in FIG. 6.

FIG. 6 illustrates the envelope 11 sealed and ready for mailing. In one embodiment, the initial address can be pre-printed on the exterior surface 56.

FIG. 7 illustrates a conventional letter opener 64 being inserted in the envelope 11 in a normal manner, for opening the envelope 11 along the fold line 12a. After the envelope 11 is opened, the contents are removed.

FIGS. 8-12 illustrate how the envelope 11 is assembled along the various fold lines for remailing.

In FIG. 8, after the original contents of the envelope 11 have been removed, the foldable panel 24 is hingably folded out of the interior of envelope 11, by unfolding along the second and third fold lines 32 and 36. Thereafter, the exterior surface 50 of the foldable panel 28 is adhesively bonded to the exterior surface 54 of the flap 14, as illustrated in FIG. 11.

Figure 9:
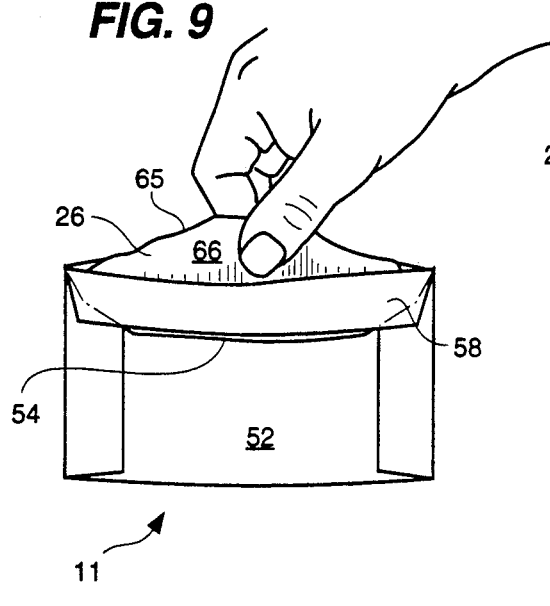
FIG. 9 is a rear view of the envelope shown in FIG. 8, with the foldable panel glued to the exterior surface of the envelope and the reusable closure flap partially removed from the inside of the envelope.
Figure 10:
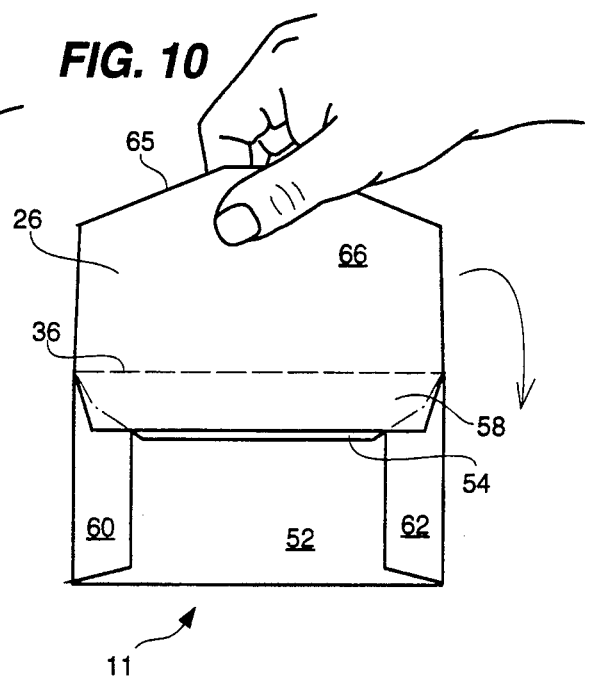
FIG. 10 is a rear view of the envelope shown in FIG. 9, with the reusable closure flap fully removed from the inside of the envelope, and ready for stuffing contents therein.

In FIGS. 9 and 10, the reusable closure flap 26 is removed from the interior of envelope 11. The user has easy access to the reusable closure flap 26 since an upper edge 65 thereof is near the fold line 12a, as shown in phantom in FIG. 7.

In FIG. 9, a user has partially removed reusable closure flap 26 by squeezing both sides of reusable closure flap 26 and pulling it out.

In FIG. 10, the reusable closure flap 26 is in the fully extended position. The envelope 11 can now be re-stuffed.

In FIGS. 11 and 12 are shown rear and front views of the envelope 11 assembled for return mail after reusable closure flap 26 is folded about fold line 36 and the adhesive strip 46 is adhesively bonded to the exterior surface 56 of the front panel 12.

In one embodiment, an exterior surface 66 of the reusable closure flap 26 includes a pre-printed return address, as illustrated in FIG. 12.

In another embodiment, the reclosure flap 26 has at least one window 67a, shown in phantom in FIG. 12, for return of a pre-printed address piece, in place of a return address on the exterior surface 66 of the flap 26. In this embodiment of the envelope 11, the front panel 12 will have a mailing window 67b, shown in phantom in FIG. 1, which registers with the window 67b.

In FIG. 13, an alternate embodiment of the envelope 11 is shown which includes a string 68 for facilitating the opening of the envelope 11 along fold line 12a after initial mailing. Preferably, a customer pulls the string 68 upwardly, in FIG. 13, in a direction perpendicular to fold line 12a for an improved tear along fold line 12a.

In FIG. 14, an alternate embodiment of a reusable envelope 70 is shown, which includes a seal flap 72 having a fold line 74 and perforation lines 76 and 78 spaced the same distance away from the fold line 74, and an adhesive strip 80 near an edge of the seal flap 72. The perforations 76 and 78 are spaced inwardly from the edge of flap 72 and are parallel to the fold line 74. In use, the seal flap 72 is folded along fold line 74 and adhered to an exterior surface 52 of the rear panel 16 by the adhesive strip 80.

In FIG. 15, a portion of the seal flap 72 between perforations 76 and 78, defining detachable part 82, is shown detached along perforations 76 and 78 to facilitate the opening of the seal flap 72 after receipt of initial mail. Here the detachable outer part 82 of the folded seal flap 72 is shown partially detached from the envelope 70.

In FIG. 16, another alternate embodiment of a reusable envelope 84 is illustrated, which includes a side loading feature. The envelope 84 is substantially the same as the envelope 11 illustrated in FIGS. 1-12, with the exception that a seal flap 86 is modified to the construction of the seal flap 72 shown in FIGS. 14 and 15, and different dimensions are utilized.

Although specific embodiments of this invention have been shown and described, it is to be understood that various modifications and substitutions, as well as rearrangements and combinations of elements of the reusable mailing envelopes 11, 70 and 84 illustrated in FIGS. 1-16, can be made by those skilled in the art without departing from the teachings of this invention. Accordingly, the scope of the invention is only to be limited as necessitated by the accompanying claims.

I claim:

1. A reusable mailing envelope made from a blank comprising:

a front panel and a rear panel, a seal flap connected to one of said panels at a fold line, said other panel being connected at a fold line to said one panel opposite said seal flap and first and second side flaps connected at fold lines to one of said panels, said side flaps being folded over and fixed to one of said panels, and, when used, said seal flap is folded over and sealed to said other panel to form a closed envelope with a back side and a front side, and reusable structure, for allowing the envelope to be reused as a mailing envelope, connected to said other panel at a first connecting fold line, the reusable structure including a foldable panel and a reusable closure flap connected at a second connecting fold line to said foldable panel, said foldable panel including a center fold line extending laterally thereacross forming a first panel section adjacent to and hingedly connected to said other panel at said first connecting fold line and a second panel section connected to said reusable closure flap and said first panel section having adhesive on a back outer surface thereof which is adjacent the outer surface of said other panel, so that, when the envelope is first used, said reusable closure flap is inserted into the envelope and, when the envelope is reused, said foldable panel sections of said separate flap structure are folded to one side of said envelope and said first panel section having said adhesive on a back outer side surface thereof is sealed to said one side of said envelope, said reusable closure flap is pulled out, the envelope is filled, and said closure flap is sealed to the other side of said envelope.

2. The envelope of claim 1 wherein said reusable structure extends in a direction away from said seal flap.

3. The envelope of claim 1 wherein said reusable closure flap includes adhesive means for adhering said reusable closure flap to an exterior surface of one of said panels when said envelope is reused.

4. The envelope of claim 1 wherein said side panels are connected to said front panel and said seal flap and said first and second side panels include adhesive means for adherence to said rear panel.

5. The envelope of claim 1 is substantially rectangular.

6. The envelope of claim 1 wherein said reusable closure flap includes a center fold line extending laterally thereacross.

7. The envelope of claim 1 further comprising means for facilitating the opening of said envelope adjacent to a fold line between said front panel and said seal flap.

8. The envelope of claim 1 wherein said seal flap includes opening means for facilitating the opening of the envelope extending laterally thereacross.

9. The envelope of claim 8 wherein said opening means comprise a string.

10. The envelope of claim 8 wherein said opening means comprise a perforated line in said sealing flap.

11. The envelope of claim 1 wherein said reusable closure flap includes a preprinted return address.

12. The envelope of claim 1 wherein said reusable closure flap and said front panel each have a window and a return mailing address piece is provided for display in said windows when said windows are aligned.

13. The envelope of claim 1 wherein said envelope includes said seal flap on a side of the envelope.

14. The envelope of claim 1 wherein said envelope includes said seal flap on the top of the envelope.

15. The envelope of claim 8 wherein said opening means includes an opening on either side of said envelope between terminating side edges of said seal flap when it is folded over along said seal flap fold line and sealed to said front side or said back side.

16. The reusable mailing envelope made from a blank comprising:
- a front panel and a rear panel,
- a seal flap having side edges and being connected to one of said panels at a fold line,
- said other panel being connected at a fold line to said one panel opposite said seal flap,
- means for connecting said panels together along adjacent side edges thereof and, when used, said seal flap is folded over and sealed to one of said panels to form a closed envelope with a back side and a front side, and
- reusable structure for allowing the envelope to be reused as a mailing envelope, connected to said other panel at a first connecting fold line, said reusable structure including a foldable panel portion and a reusable closure flap connected at a second connecting fold line to said foldable panel, said foldable panel portion including a center fold line extending laterally thereacross forming a first panel section adjacent to and hingedly connected to said other panel at said first connecting fold line and a second panel section connected to said reusable closure flap and said first panel section having adhesive on a back outer side surface thereof which is adjacent the outer surface of said other panel so that when the envelope is first used, said reusable flap is in the envelope and, when said envelope is reused, said envelope is filled, followed by sealing said reusable closure flap to one side of said envelope and by sealing said first panel section having said adhesive on a back outer side surface thereof to the other side of said envelope.

17. The envelope of claim 16 wherein said opening means includes an opening on either side of said envelope between said side edges of said seal flap when it is folded over along said seal flap fold line and sealed to one side of said envelope.

* * * * *